Feb. 17, 1925.  
L. M. ASPINWALL  
1,526,410  
CAR STRUCTURE  
Filed March 14, 1921  2 Sheets-Sheet 1

WITNESSES:  
John W. Whiting  
H. C. Lowe

INVENTOR  
Louis M. Aspinwall.  
BY  
Wesley G. Carr  
ATTORNEY

Patented Feb. 17, 1925.

1,526,410

UNITED STATES PATENT OFFICE.

LOUIS M. ASPINWALL, OF PITTSBURGH, PENNSYLVANIA, ASSIGNOR TO WESTINGHOUSE ELECTRIC & MANUFACTURING COMPANY, A CORPORATION OF PENNSYLVANIA.

CAR STRUCTURE.

Application filed March 14, 1921. Serial No. 452,307.

*To all whom it may concern:*

Be it known that I, LOUIS M. ASPINWALL, a citizen of the United States, and a resident of Pittsburgh, in the county of Allegheny and State of Pennsylvania, have invented a new and useful Improvement in Car Structures, of which the following is a specification.

My invention relates to car structures and it has particular relation to the method of mounting a car body upon its axles.

The object of my invention is to provide a suitable mounting for a light car body, such as employed for one-man cars, upon its axles, no trucks being employed.

A second object of my invention is to provide means for connecting the axles of a car body, which shall allow for the vertical motion of its axles relative to the car body with a minimum amount of relative horizontal displacement and which shall transmit the driving tractive effort of the motors upon the axles to the car body.

Briefly speaking, my invention consists in providing a horizontally projecting journal arm which is rigidly secured to a car journal mounted upon an axle and also pivotally connected to a bracket which is secured to the car body, the pivotal connection being substantially in the same plane (preferably the horizontal) as the axis of the car axle. Therefore, the horizontal displacement of the car axle with relation to the point of pivotal support of the journal arm upon the bracket is a minimum, when the car axle is actuated in a vertical direction, this displacement being equal to the distance between the point of pivotal support of the horizontal projecting arm and the axis of the car axle times one minus the cosine of the angle of displacement, with the point of pivotal support being taken as the vertex of the angle and assuming a rigid journal arm.

For a better understanding of my invention, reference should be made to the accompanying drawings in which—

Figure 1:
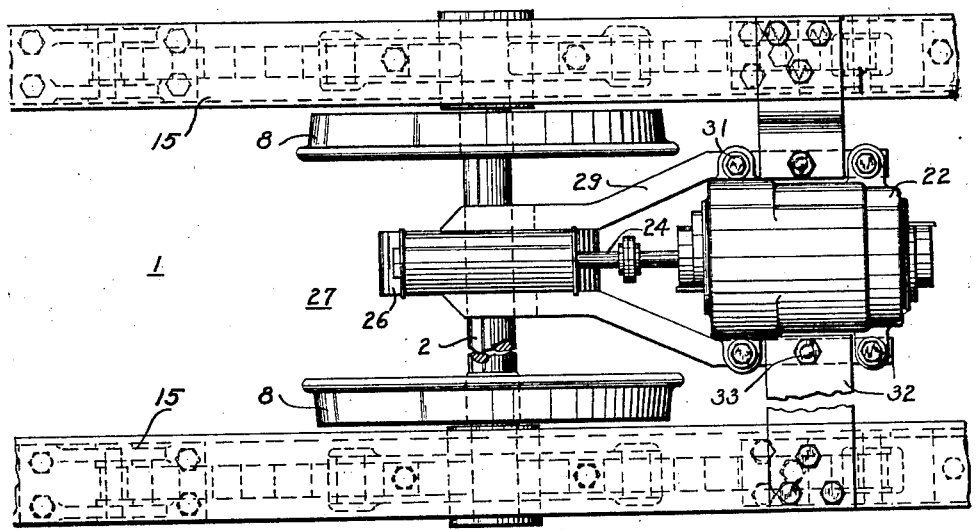
Figure 2:
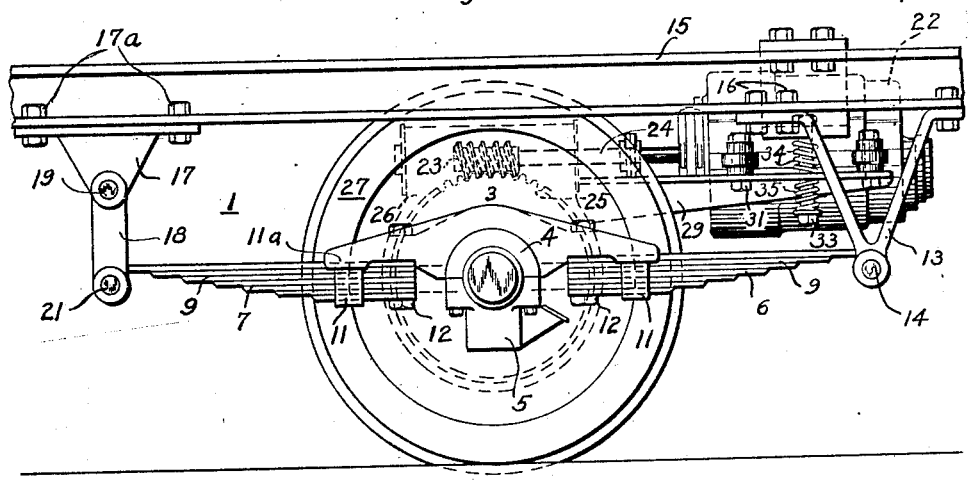
Figure 3:
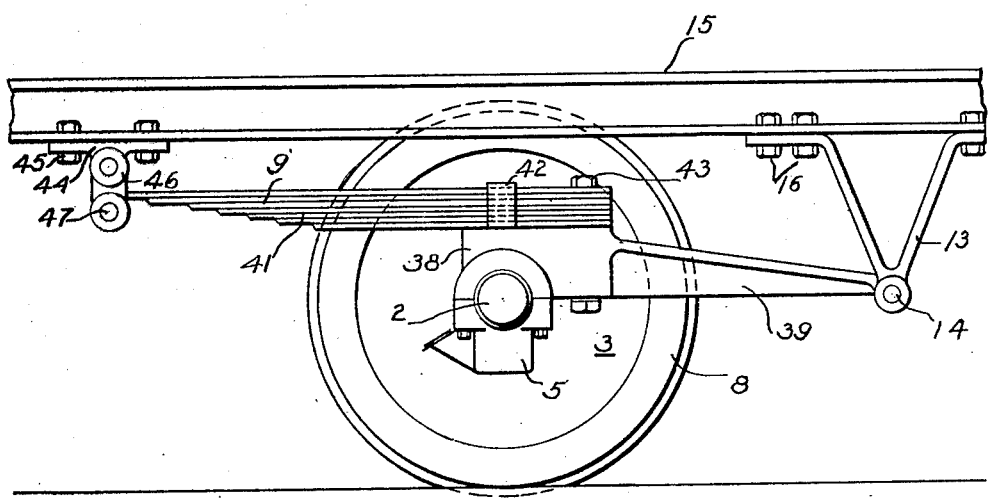
Figure 4:
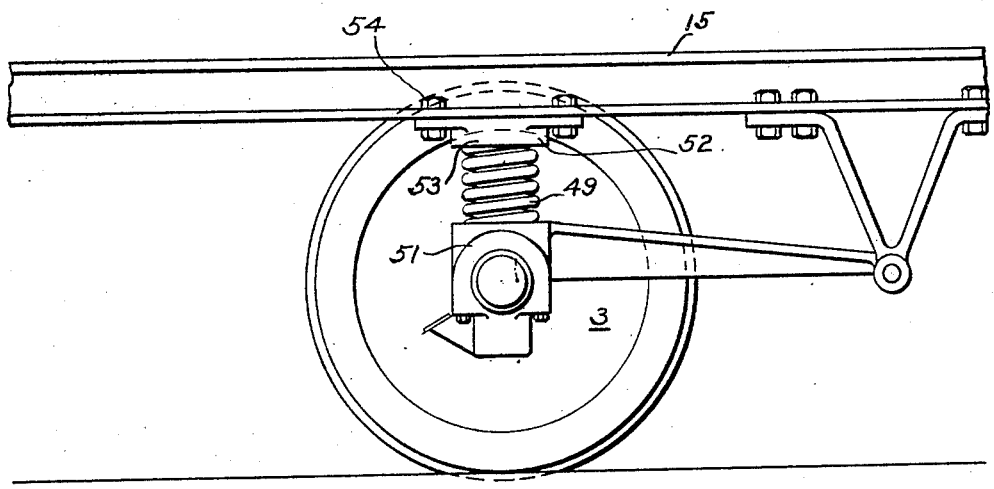

Figures 1 and 2 are views, in plan and in side elevation, respectively, of a car body mounted in accordance with my invention upon a plurality of axles, only one of which is shown; and Figs. 3 and 4 are views, in side elevation, of modified forms of mountings for a car body embodying my invention.

Referring particularly to Figs. 1 and 2, a car body 1 is mounted upon each of a plurality of axles 2, only one of which is shown, by means of a journal 3, comprising an upper portion 4, a lower portion 5 and a plurality of resilient horizontally projecting arms 6 and 7. A plurality of car wheels 8 are rigidly secured to the axles 2 and are actuated thereby.

The horizontal arms 6 and 7 comprise a plurality of leaf springs 9, which are firmly secured to the upper portion 4 of the car journal 3 by means of bolts 12 and restrained from lateral movement by bands 11, which are secured to flanges 11a.

The arm 6 has its one end pivotally connected to a bracket 13 by means of a pin 14. The bracket 13 is rigidly secured to the frame 15, forming part of the car body 1, through the agency of bolts 16. The horizontal projecting arm 7 is pivotally mounted upon the car frame 15 by means of a bracket 17 that is rigidly secured thereto by a plurality of bolts 17a, links 18 and pins 19 and 21.

The axes of the pins 21 and 14 and the axis of the axle 2 are substantially in the same plane, with the vehicle carrying its average load. The axle of the car, 2, may be driven from any source of power suspended from the car body such as, for instance, a motor 22 to which it is mechanically connected by a worm drive mechanism comprising a worm 23 mounted upon the shaft 24 and worm gear-wheel 25. The upper portion 26 of the worm-and-gear wheel housing 27 is secured to the motor 22 by means of supporting arms 29, made of angle irons that form an integral part of the upper portion 26.

The motor 22 is secured to the arms 29 by means of bolts 31. The angle irons 29 are resiliently mounted upon the frame 15 by means of suitable plates 32, bolts 33 and springs 34 and 35.

The operation of my invention, when one of the wheels 8 of the car strikes an irregularity in the surface of the track is as follows: If the irregularity is either a depression or elevation, it will cause the wheel 8 to be vertically displaced with relation to the car frame 15. The axle 2 will turn through a relatively small angle about the pin 14, the distance between the axis of the axle 2 and the axis of the pin 14 remaining substantially constant. The pin 21 will be actuated toward the pin 14 by the movement of the arm 7. This movement is permitted by reason of the link 18 being rotatably mounted upon the bracket 17 by means of the pin 19.

It is apparent that the horizontal displacement of the axle 2 is equal to the distance from the axis of the pin 14 to the axis of the axle 2 times one minus the cosine of the angle of displacement of the axle 2, with the vertex of the angle being taken as the axis of the pin 14, neglecting the flexure of the member 6. When the angle of rotation is relatively small, it is apparent that the rate of change in the value of the cosine of the angle is relatively slight, therefore, if the vertical displacement is relatively small in proportion to the distance between the pin 14 and the axle 2, the horizontal displacement will be almost inappreciable.

Mathematically expressed, $d = a (1 - \cos x)$ where $d$ = horizontal displacement $a$ = distance between the axes of the axle 2 and the pin 14, $x$ = the angular displacement. Hence, when $x = o$ and $\cos x = 1$, it follows that $d = o$ (approximately).

Considerable advantage is secured by having relatively slight horizontal displacement, as it lessens the stress put upon the axle 2 and the distance between the front and rear wheel will be also maintained substantially constant. As the motor 22 is resiliently mounted upon the bolts 33 and as it is rigidly secured to the upper portion 26 of the worm drive housing 27 it will move with the axle 2, and the worm 23 will remain in mesh with the gear-wheel 25.

Referring to Fig. 3, the corresponding parts are designated by the same numbers as in Figs. 1 and 2. For the sake of clearness and to avoid unnecessary complications, the motor 22 and the worm-drive mechanism have been omitted. The upper portion 38 of the journal 3 and the horizontal arm 39 form an integral structure and may be a forging, a casting or a composite structure. The arm 39 is pivotally mounted upon the bracket 13 by the pin 14, the same as for the mounting shown in Figs. 1 and 2. With this mounting, the distance between the axis of the car axle 2 and the axis of the pin 14 is maintained substantially constant.

A resilient arm 41 comprising a plurality of leaf springs 9 is secured to the upper portion 38 of the car journal 3 by means of a strap 42 and a bolt 43. The other end of the resilient arm 41 is pivotally mounted upon the car frame 15 by means of bracket 44 and by a plurality of bolts 45, links 46 and pins 47. The operation of this mounting is substantially the same, when the wheels 8 and axle 2 undergo relative vertical displacement with reference to the car body 1, as that of the mounting shown in Figs. 1 and 2.

Fig. 4 is another modified form of my invention and is substantially similar to that shown in Fig. 3 except that the resilient arm 41 is not employed, but a resilient mounting comprising a resilient member 49 is positioned upon and secured to the upper portion 51 of the car journal 3, while the frame 15 is positioned upon the resilient member 49 by means of a casting 52 having a cylindrical portion 53 upon which the resilient member 49 is mounted. The casting 52 is mechanically connected to the frame 15 by means of bolts 54. This method of mounting the car body 1 upon the axle 2 provides for the full vertical thrust of the car body 1 upon the axle 2 being taken by the resilient member 49.

In both Figs. 3 and 4, the axis of the axle 2 and the axis of the pin 14 are mounted in substantially the same plane, for the reasons that are set forth in describing the mounting that is shown in Figs. 1 and 2.

From the above description, it is apparent that some of the principal advantages of my invention are:—that the horizontal displacement of the axle 2 with relation to the car body 1 is relatively very slight, upon the vertical displacement of the wheels resulting from irregularities in the track, and that the horizontal thrust of the worm upon the gear wheel is transmitted directly from the car axle to the bracket attached to the car body, by means of the horizontal arm. By employing a resilient arm such as shown in Fig. 3, the deflection of the supporting spring is considerably greater than the deflection of the car body.

While I have shown my invention in a preferred form, minor modifications in the shape and position of the different parts of apparatus embodying the invention may be made without departing from the scope thereof. I desire, therefore, to be limited only by the scope of the appended claims.

I claim as my invention:—

1. The combination with an axle and a wheel mounted upon said axle, of a car body, a journal box mounted upon said axle, and a laterally restrained arm secured at one of its ends to said journal and at its other end pivotally connected to said car body, the axis of rotation of said wheel being in substantially the same horizontal plane as the axis about which said arm turns.

2. The combination with an axle and a wheel mounted upon said axle, of a car body, a bracket rigidly secured to said body, a journal mounted upon said axle and a laterally restrained arm rigidly secured to said journal and pivotally secured to said bracket, the axis of rotation of said wheel and the point of pivotal support of said arm being in substantially the same horizontal plane.

3. The combination with a car body, an axle, and a wheel mounted upon said axle, of a journal box having a rigid horizontal arm mounted upon said axle, a bracket secured to said body to laterally restrain said arm, a pin for pivotally connecting one end of said arm to said bracket, the axis of said pin being in substantially the same horizontal plane as the axis of said axle, a resilient arm secured to said journal box, and means comprising a link for movably connecting said resilient arm to said car body.

4. The combination with a car body, an axle, and a wheel mounted upon said axle, of a journal box having a rigid arm mounted upon said axle, a bracket secured to said body, a pin for pivotally connecting one end of said arm to said bracket to laterally restrain said arm, the axis of said pin being in substantially the same horizontal plane as the axis of said axle, and means comprising a resilient member positioned between said journal box and said car body for transmitting the vertical thrust of said car body to said journal box.

In testimony whereof, I have hereunto subscribed my name this 4th day of March, 1921.

LOUIS M. ASPINWALL.